No. 789,493. PATENTED MAY 9, 1905.
E. FRANTZICH & F. E. PETERSON.
MAIL COLLECTING AND DELIVERY SYSTEM.
APPLICATION FILED MAY 20, 1904.
5 SHEETS—SHEET 1.
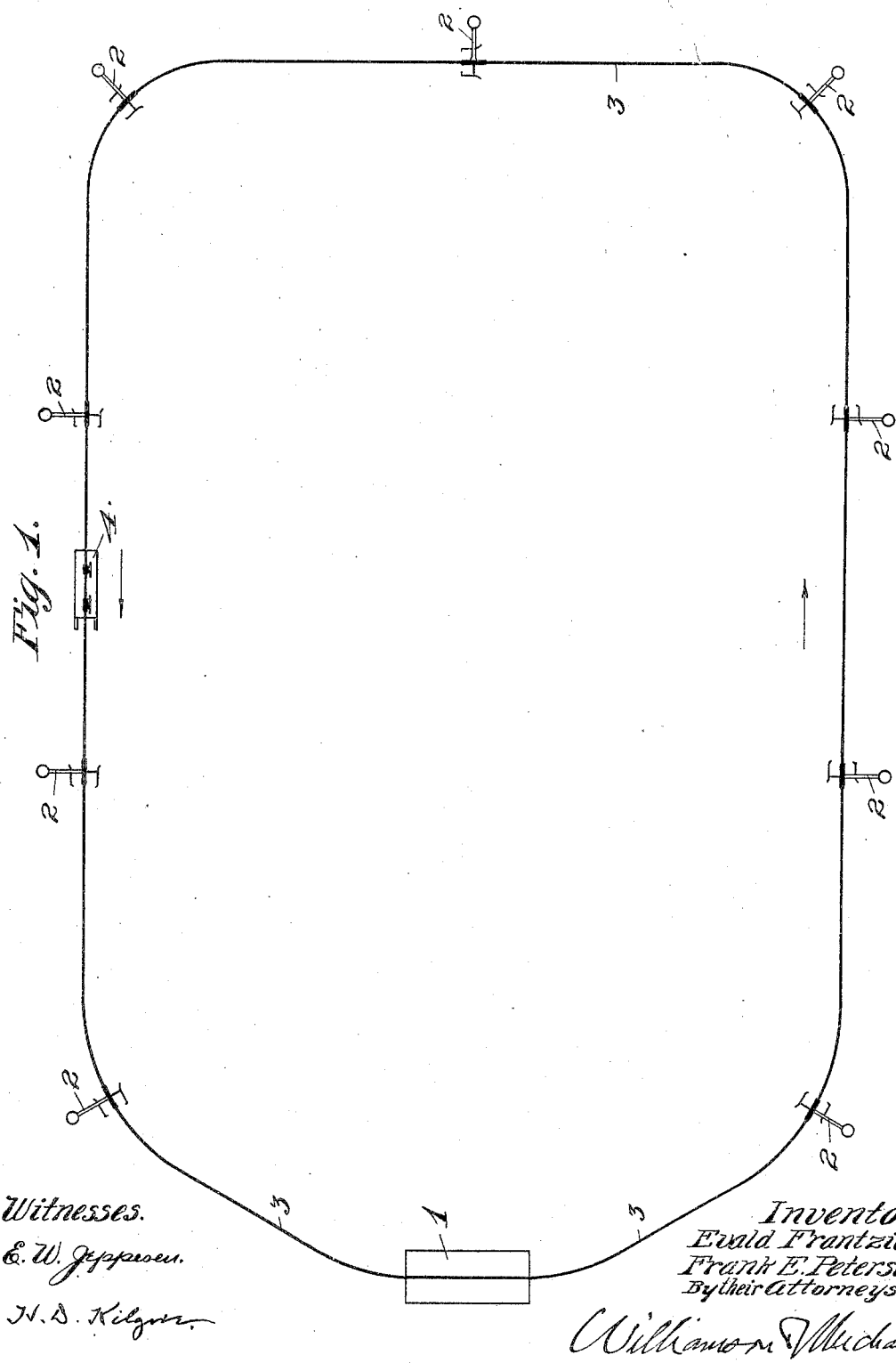
Witnesses.
E. W. Jeppesen.
N. D. Kilgore.
Inventors
Evald Frantzich.
Frank E. Peterson.
By their Attorneys.

No. 789,493. PATENTED MAY 9, 1905.
E. FRANTZICH & F. E. PETERSON.
MAIL COLLECTING AND DELIVERY SYSTEM.
APPLICATION FILED MAY 20, 1904.
5 SHEETS—SHEET 2.
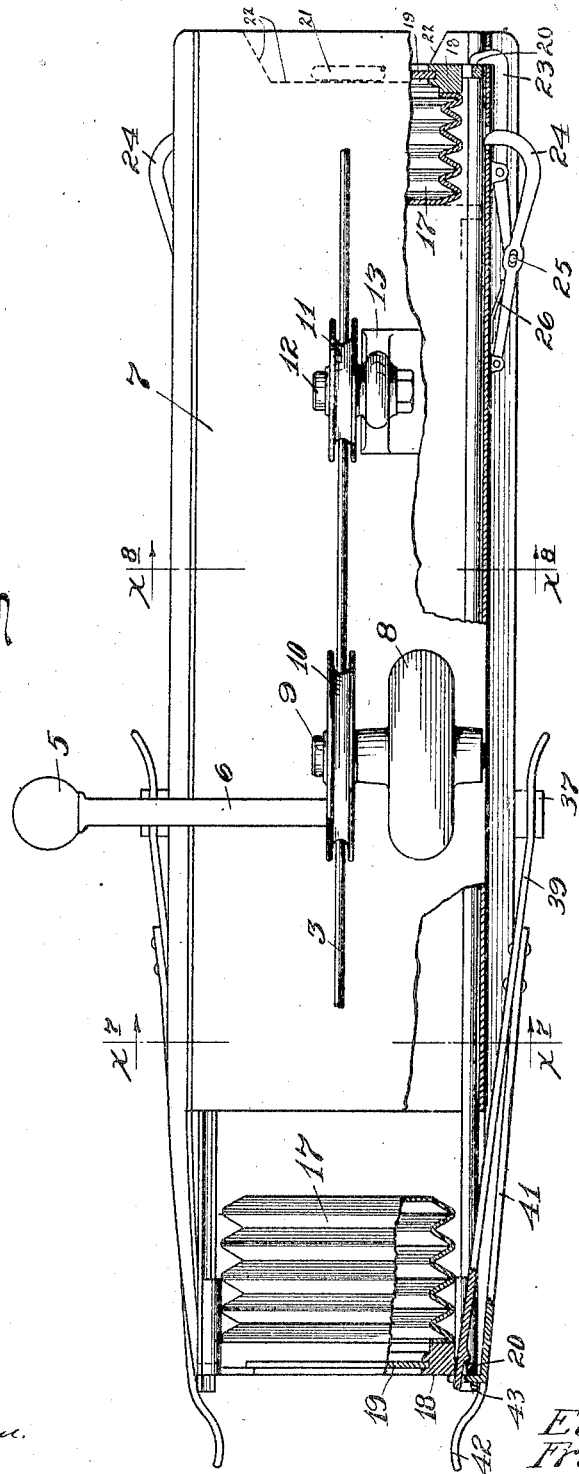
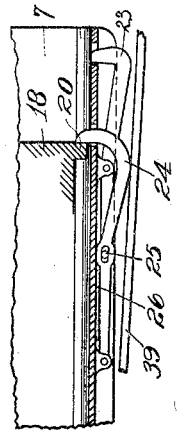
Witnesses.
E. W. Jeppesen.
H. D. Kilgon
Inventors
Evald Frantzich.
Frank E. Peterson.
By their Attorneys.
Williamson & Merchant

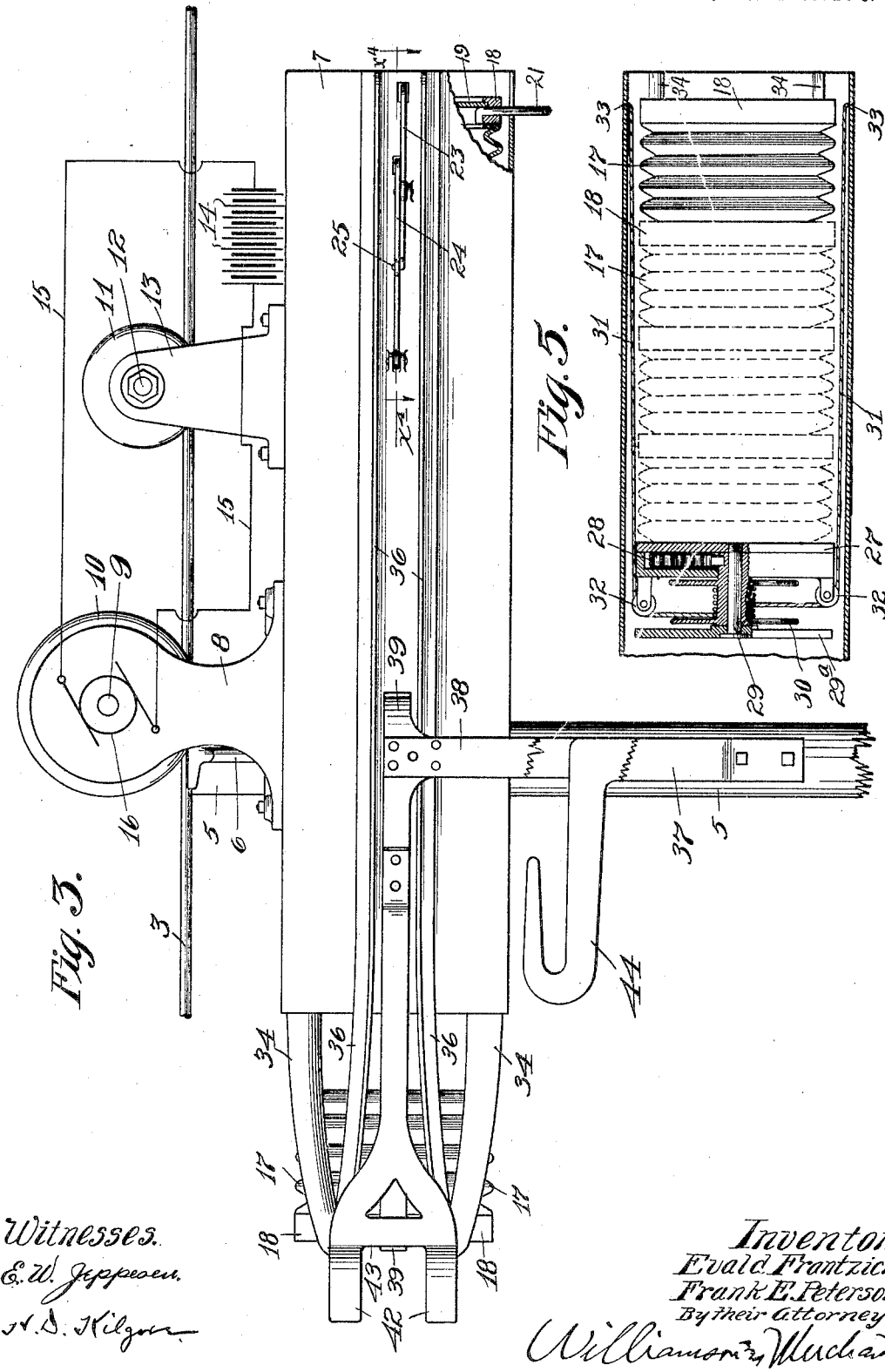

No. 789,493. PATENTED MAY 9, 1905.
E. FRANTZICH & F. E. PETERSON.
MAIL COLLECTING AND DELIVERY SYSTEM.
APPLICATION FILED MAY 20, 1904.
5 SHEETS—SHEET 4.
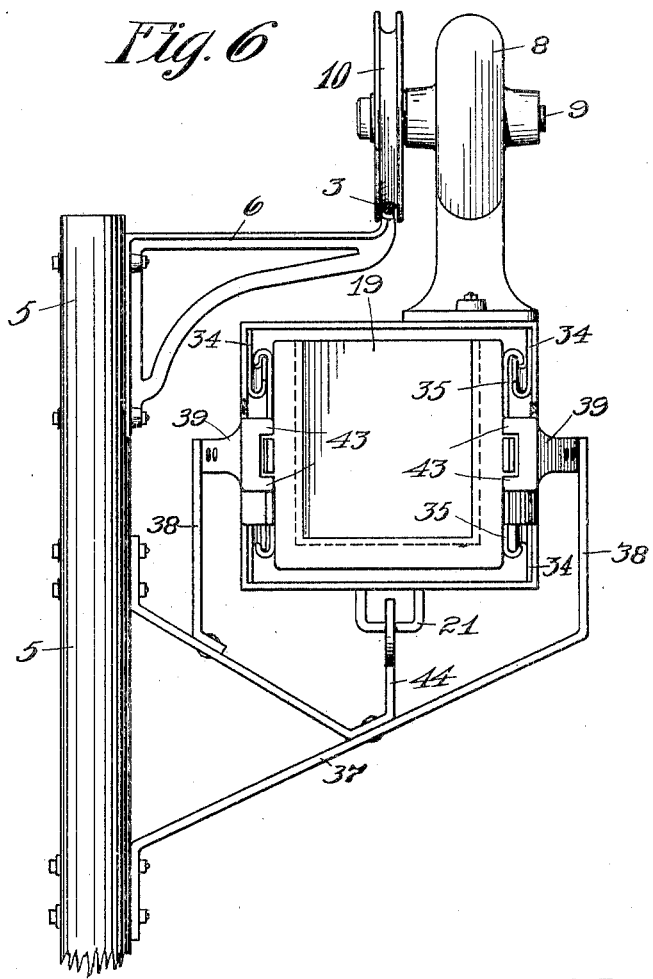
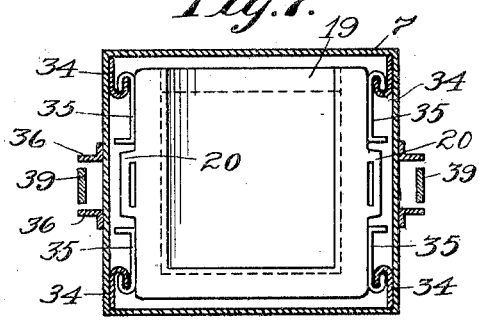
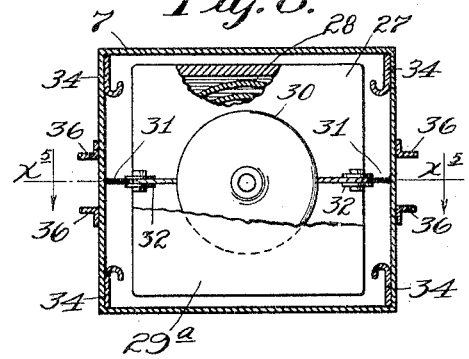
Witnesses.
E. W. Jeppesen.
H. S. Kilgore.
Inventors
Evald Frantzich.
Frank E. Peterson.
By their Attorneys
Williamson Merchant No. 789,493. PATENTED MAY 9, 1905.
E. FRANTZICH & F. E. PETERSON.
MAIL COLLECTING AND DELIVERY SYSTEM.
APPLICATION FILED MAY 20, 1904.

5 SHEETS—SHEET 5.

Witnesses.
E. W. Jeppesen.
N. D. Kilgore

Inventors
Evald Frantzich.
Frank E. Peterson.
By their Attorneys.
Williamson & Merchant No. 789,493. Patented May 9, 1905.

UNITED STATES PATENT OFFICE.

EVALD FRANTZICH AND FRANK E. PETERSON, OF LOWRY, MINNESOTA.

MAIL COLLECTING AND DELIVERY SYSTEM.

SPECIFICATION forming part of Letters Patent No. 789,493, dated May 9, 1905.

Application filed May 20, 1904. Serial No. 208,991.

*To all whom it may concern:*

Be it known that we, EVALD FRANTZICH and FRANK E. PETERSON, citizens of the United States, residing at Lowry, in the county of Pope and State of Minnesota, have invented certain new and useful Improvements in Mail Collecting and Delivery Systems; and we do hereby declare the following to be a full, clear, and exact description of the invention, such as will enable others skilled in the art to which it appertains to make and use the same.

Our invention has for its especial object to provide a simple and efficient device for automatically collecting and delivering mail, but relates, broadly, to automatic systems for delivering or collecting or delivering and collecting parcels.

To the above ends the invention consists of the novel devices and combination of devices hereinafter described, and defined in the claims.

The invention is illustrated in the accompanying drawings, wherein like characters indicate like parts throughout the several views.

Figure 9:
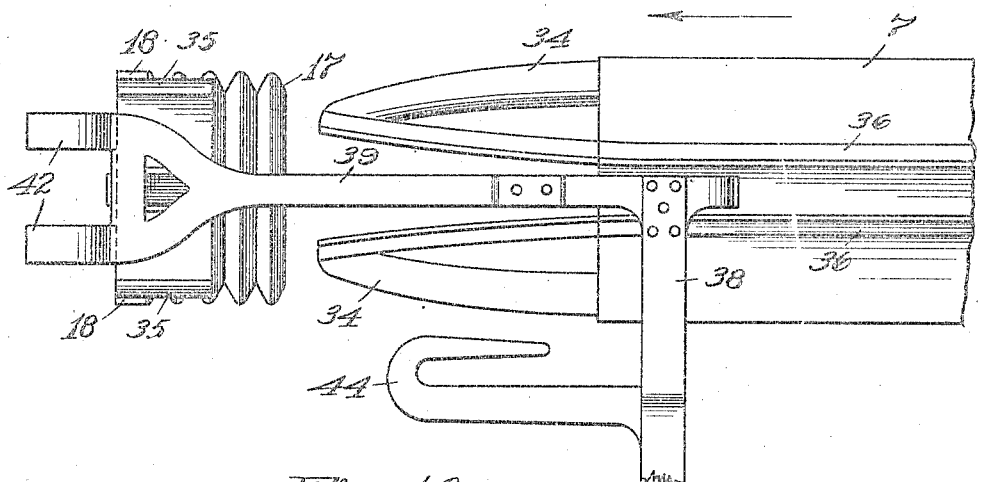
Figure 10:
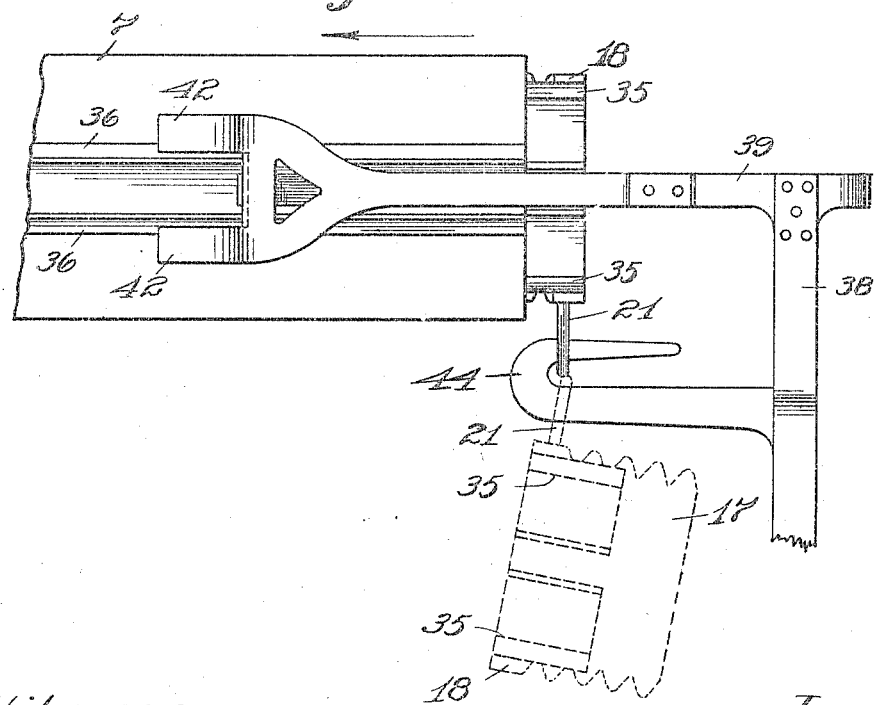

Figure 1 is a diagrammatic plan view illustrating an endless route, including a local starting-station or headquarters, an endless track, a plurality of stations along the route, and a "bag-carrier," so called, which travels over the endless track from the starting-station, past the substations along the route, and back to the starting-point. Fig. 2 is a view partly in plan and partly in horizontal section, showing a portion of an overhead track and showing a partially-loaded bag-carrier which travels over the said track. Fig. 3 is a side elevation of the parts shown in Fig. 2 and showing also a portion of one of the posts and associated devices which are located at the several substations. Fig. 4 is a detail in horizontal section on the line $x^4 x^4$ of Fig. 3, but showing the parts in different positions than in Fig. 2, some parts being broken away. Fig. 5 is a horizontal section on the line $x^5 x^5$ of Fig. 8. Fig. 6 is a transverse vertical section on the line $x^6 x^6$ of Fig. 3. Fig. 7 is a transverse vertical section on the line $x^7 x^7$ of Fig. 2. Fig. 8 is a transverse vertical section taken approximately on the line $x^8 x^8$ of Fig. 2, some parts being removed. Fig. 9 is a detail view, in side elevation, showing the bag holding and receiving devices at one of the substations and a bag held thereby and showing diagrammatically the forward portion of the traveler coming into position for action on the bag which is to be taken up thereby; and Fig. 10 is a similar view to Fig. 9, but shows the rear end of the traveling carrier and illustrates different positions of the other parts.

Referring first to Fig. 1, the numeral 1 indicates the starting-station or headquarters. The numeral 2 indicates the substations along the line of travel. The numeral 3 indicates an endless track or rail which runs from the starting-station past the several substations and back to the starting-station or headquarters 1. The numeral 4 in the said view indicates as an entirety a traveling carrier which runs over the endless track or rail 3. In the said Fig. 1 all of the parts are indicated only in diagram and are marked as entireties, the said view being simply intended to indicate the general plan of the system.

In practice the endless track or rail is advisably afforded by a single overhead wire, (indicated also by the numeral 3,) which wire is supported at the starting-station, at the substations, and at suitable intervals along the line of travel from vertical poles 5, having laterally-projecting brackets 6 at their upper ends, the outer ends of which brackets are upturned and brazed or otherwise rigidly secured to the lower surface of the said rail-wire. Those poles which are located at the substations are provided with means for holding the mail-bags in position for collection and are also provided with means for receiving and holding the bag which is delivered thereto by the traveling bag-carrier.

The traveling bag-carrier is arranged to hold a plurality of mail-bags, and means are provided for propelling this carrier over the endless rail-wire and for causing the same in passing each substation to collect or pick up one mail-bag and to drop or deposit another.

The traveling carrier is preferably in the form of a long rectangular box-like case 7, which is open at both ends and is preferably constructed of sheet metal, such as galvanized iron, to protect the contents thereof from rain and from the other elements. This traveling carrier may be driven or caused to travel over the rail-wire in a great many different ways; but in the drawings it is shown as arranged to be driven by an electric motor supplied with current from a storage battery, which motor and battery are mounted on and carried by the said carrier.

The numeral 8 indicates the motor, the frame of which is rigidly secured on top of the carrier-case 7 and the armature-shaft 9 of which has rigidly secured at one end a grooved traction-wheel or sheave 10, that rests upon and runs over the rail-wire 3. Coöperating with the traction-wheel 10 to suspend and guide the carrier is an idle guide-sheave 11, which is mounted on a projecting stub 12 of a bracket 13, rigidly secured to the top of the carrier-case 7.

The numeral 14 indicates the storage battery, and the numeral 15 indicates the leads, which extend therefrom to the commutator 16 of the motor 8.

The mail-bags are adapted to fit loosely within the carrier-case 7, and, as shown and preferred, they are made up of extensible accordion-like sections 17, rectangular marginal frames 18, and slides 19, which slides normally close the bag-openings through the frames 18.

When the carrier is started out from the main station 1, it is either partly or completely filled with these mail-bags, which are placed end to end with their rectangular frames 18 turned toward the rear end of the carrier-case 7. The frames 18 are provided at their sides with perforated lugs 20, and they are provided with loosely-depending yokes 21, adapted to drop into the positions indicated in Figs. 6 and 10 under the action of gravity. Springs may be provided to further insure the dropping of the said yokes into the positions indicated. All the yokes of the bags placed within the case 7 except the one at the extreme rear will rest upon the bottom of said case and will be held upward thereby. The one at the extreme rear, however, will always stand in a lowered position, because the bottom of said case is cut away at 22 to afford clearance therefor.

Mounted on each side of the carrier-case 7, with their noses working through perforations in said sides of the case, is a pair of alternately-acting pawls 23 and 24, which pawls are pivotally connected at 25 and are subject to a spring 26 on the corresponding side of the case. The spring 26 normally holds the pawl 24 in an inoperative position and the pawls 23 in an operative position. The free ends of the pawls 23 and 24 when forced inward stand in positions to engage the lugs 20 of the bag-frames 18. (See Figs. 2 and 4.)

The mail-bags, it will be noted, are extensible and contractible. To hold the several mail-bags, which may be more or less filled with mail, in as compact form as possible and to keep them fed rearward within the carrier-case 7, we provide a spring-pressed follower 27, which is preferably rectangular and of such size that it loosely fits the interior cross-section of the case 7. This follower is recessed, and within the said recess is located a coiled spring 28, the outer end of which is attached to the said follower. A stud 29 projects forward from the central portion of the follower 27, and mounted on the said stud is a sheave 30, to the hub of which the inner end of the spring 28 is attached, so that the said spring tends to rotate said sheave. A pair of cords 31 are attached at their forward ends to the sheaves 30, passed over intermediate guide-sheaves 32 on the follower 27, and are attached at their rear ends at 33 to the sides of the carrier-case 7. In this way the follower 27 is put under yielding strain to move rearward and hold the mail-bags at the rear thereof compactly pressed together.

Rigidly secured within the case 7 and to each side thereof is a pair of flanged bag-guiding rails 34, the forward ends of which project ahead of the case 7 and converge in a forward direction. (See particularly Figs. 3 and 7.) For coöperation with these guide-rails 34 the bag-frames 18 are provided at each side with a pair of flanged keepers 35, which engage therewith, as best shown in Fig. 7. Secured to each side of the carrier-case 7 is a pair of longitudinally-extended exterior guide-bars 36, which at their forward ends diverge and project ahead of the said case for a purpose which will presently appear.

To the post 5 at each substation is secured a bracket 37, having vertical prongs 38, which project on opposite sides of the space occupied by the carrier-frame 7 in passing a substation. (See particularly Fig. 6.) Secured to the upper end of each arm 38 and projecting horizontally forward is a spring-arm 39, having near its forward end a stop-lug 40. Riveted or otherwise attached to each spring-arm 39 is a spring latch-arm 41, which at its free end is, as shown, formed with a pair of inwardly-bent trip-fingers 42 and between said trip-fingers is formed with an inturned latch-flange 43, that is notched, so as to normally embrace the free end of the coöperating bag-supporting arm 39. The said arms 39 and 41 afford a bag-supporter for suspending the mail-bag in the line of travel of the traveling carrier, so that it may be automatically taken up by the said carrier. To thus support the bag, as shown in Figs. 2 and 9, the latch-arms 41 are sprung outward, the free ends of the arms 39 are inserted through the perforated side lugs 20 on the bag-frames 18, and the said latch-arms 41 are then released and allowed to spring inward and hold the said bag in the supported position, as shown in said Figs. 2 and 9.

Supported by each bracket 37 in position to engage the depending yoke 21 of the bag at the extreme rear end of the traveling carrier is a catch-hook 44. (See Figs. 3, 6, 9, and 10.)

Operation: We will now assume that a mail-bag is supported by the means described at each substation, that the case 7 of the traveling carrier is filled or partially filled with mail-bags either empty or having mail therein for delivery, and that the said traveling carrier is started on its course by throwing its impelling-motor into action. Fig. 9 shows the carrier approaching the mail-bag at one of the substations. When the forward ends of the sides of the case 7 strike the trip-fingers 42 of the latch-arms 41, the latch-flanges 43 of said arms are forced away from the free ends of the arms 39 and out of the paths of movement of the perforated lugs 20 on the mail-bag frame 18. At approximately the same time the converging ends of the guide-rails 34 on the interior of the case 7 come into action on the flanged keepers 35 on the frame of the suspended mail-bag. Hence under the continued forward movement of the traveling carrier the said mail-bag is carried off from the arms 39 and by the rails 34 is guided into the interior of the case 7 and is thrown against the follower 27, or rather against the disk-like head 29$^a$ of the stud 29. The spring-arms 39 and 41 yield or spread laterally to permit the case 7 of the traveling carrier to pass between. As the carrier passes between the spring-arms 39 the outwardly-bowed free ends of the dogs 24 on the carrier-case 7 engage with the rear ends of the spring-arms 39 and are pressed inward, thereby throwing the free ends of the dogs 23 outward, as shown in Fig 4, thus releasing the rearmost mail-bag contained within the carrier-case and causing the pawls 24 to intercept the rearward movement of the mail-bag next forward. At approximately the same time the depending yoke 21 of this rearmost mail-bag is under the forward movement of the carrier caught by the hook 44, as shown in Fig. 10, and the mail-bag thus caught by the said hooks will be pulled from the carrier and will drop into the position indicated by dotted lines in Fig. 10. It will thus be seen that whenever the traveling carrier passes a substation it will take up one mail-bag and drop another and will repeat this action all along the route at the various substations until it has deposited all of the mail-bags which were placed in it at the starting-station and has collected all of the mail bags which were supported in position for collection at the several substations. The carrier will therefore return to the starting-point or main station with a load of collected mail.

The device described while especially adapted for collecting and delivering mail is nevertheless capable of general use wherever it is desired to collect and deliver parcels or packages of any kind. It will therefore be understood that the device described is capable of large range of modification within the scope of our invention as herein set forth and claimed.

As has already been stated, motors of various forms may be employed to impart traveling movement to the carrier. In some instances an explosive-gas engine may be used and in other, where an electric motor is employed, it may be supplied with current transmitted thereto from the rail-wire or from an independent line-wire. Other forms of track and of truck devices for mounting the traveler on the track may also be employed.

What we claim, and desire to secure by Letters Patent of the United States, is as follows:

1. The combination with a track, and means for supporting a bag or parcel in the vicinity of the track, of a traveling carrier movable over said track, adapted to contain and to receive bags or parcels, and provided with means for releasing one bag at one end and taking up another at the other end, substantially as described.

2. The combination with a track, and a traveling carrier movable over the same, which carrier is adapted to receive at one end and to contain a plurality of bags or parcels, and is provided with a releasing device for releasing one bag at a time at the other end, of a bag or parcel supporting device arranged to support a bag in the line of travel of said carrier, and a local device for actuating said bag-releasing device as the traveler passes the same, substantially as described.

3. The combination with a starting-station, an endless track leading from and to said starting-station, and a plurality of substations at intervals along the track, of a traveling bag or parcel carrier constructed to receive a bag or parcel at one end, and to release a bag or parcel at the other end adapted to run over said track, and means at the substations for causing said carrier to drop a bag or parcel, substantially as described.

4. The combination with a track, of a carrier movable over said track and having a case open at both ends and adapted to receive bags or parcels at its forward end, and to deliver the same from its rear end, and means located at intervals along the line of travel of said carrier for supporting a bag or parcel in position to be taken up thereby and for causing a bag to be discharged from the rear end thereof, substantially as described.

5. The combination with a track, of a carrier mounted to travel over the same, and having a case open at both ends and adapted to receive bags or parcels at its forward end, and to deliver them from its rear end, a spring-pressed follower operating on certain of the bags contained within said carrier to force the same rearward, escapement-acting pawls for releasing the bags one at a time at the rear end of said carrier, bag-supporting devices along the line of travel of said carrier supporting the bags in position to be taken up by said carrier, and means for actuating said escapement-dogs to release the rear bags one at a time, substantially as described.

6. The combination with a track, of a carrier mounted to travel on the same, which carrier has a case open both at its front and rear ends respectively to receive and discharge bags or parcels, a bag-releasing device at the rear end of said case, means located along the line of travel of the carrier for holding the bags or parcels in position for entry into the forward end of said carrier-case, said means involving spring-arms and spring-latches, and which latches are released by said carrier, and which arms yield to permit the carrier to pass, and also operate bag-releasing devices at the rear end of said carrier, substantially as described.

7. The combination with an overhead track, of spring-arms and spring-latches and bag-receiving hooks located at substations along the track, a traveling carrier mounted to run over said track and having a case, open at its forward end to receive the bags, and open at its rear end to discharge other bags, bag-releasing devices at the rear end of said carrier-case, bags within said carrier-case, having depending yokes which, when projected, will be engaged by the local bag-receiving hooks, means on the carrier for holding all of the bag-yokes retracted except that of the rear bag, means along the line of travel for actuating said bag-releasing devices, and which spring-arms yield to permit the carrier to pass, and which spring-latches are released by the said carrier in passing, substantially as described.

In testimony whereof we affix our signatures in presence of two witnesses.

EVALD FRANTZICH.
FRANK E. PETERSON.

Witnesses:
ROBERT C. MABEY,
F. D. MERCHANT.